United States Patent [19]
Mori et al.

[11] Patent Number: 5,526,125
[45] Date of Patent: Jun. 11, 1996

[54] EDITING DEVICE FOR SEQUENTIALLY EDITING DESIRED DISCRETE SCENES OF RESPECTIVE USER-SPECIFIED DURATIONS

[75] Inventors: Akinari Mori, Tokyo; Yoshio Kondo, Chiba, both of Japan

[73] Assignee: Sony Corporation, Tokyo, Japan

[21] Appl. No.: 251,338

[22] Filed: May 31, 1994

[30] Foreign Application Priority Data

May 31, 1993 [JP] Japan .................... 5-152863

[51] Int. Cl.⁶ .................................................... H04N 9/79
[52] U.S. Cl. ..................... 358/311; 358/335; 358/312; 360/10.1
[58] Field of Search .................... 360/10.1; 358/311, 358/312, 335; 348/211

[56] References Cited

U.S. PATENT DOCUMENTS

| | | | |
|---|---|---|---|
| 4,272,790 | 6/1981 | Bates | 360/10.1 |
| 4,866,542 | 9/1989 | Shimada et al. | 358/335 |
| 5,025,324 | 6/1991 | Hashimoto | 358/335 |
| 5,055,937 | 10/1991 | Yamada et al. | 358/335 |
| 5,258,875 | 11/1993 | Hashimoto | 358/335 |
| 5,282,048 | 1/1994 | Bae | 358/335 |
| 5,323,243 | 6/1994 | Cheon | 358/335 |

*Primary Examiner*—Tommy P. Chin
*Assistant Examiner*—Luanne P. Din
*Attorney, Agent, or Firm*—Jay H. Maioli

[57] ABSTRACT

An editing device for sequentially editing desired scenes or cuts. The editing device includes a CPU 11 which, when triggered by actuation of an edit button switch 12, issues a rewind playback command signal to a video camera 1 for a pre-set time, while issuing a pause canceling command signal to a VTR 2. After lapse of a pre-set time since the issuance of the pause canceling command signal, as set by a rotary switch 13, the CPU 11 outputs a pause setting command signal to the VTR 2. An infrared LED 14 converts the command signals from the CPU 11 and outputs the converted signals. The editing may be achieved by a simple operation of pressing the edit button switch 12 for facilitating the operation as compared to that with the conventional device.

6 Claims, 5 Drawing Sheets

EDITING DEVICE FOR SEQUENTIALLY EDITING DESIRED DISCRETE SCENES OF RESPECTIVE USER-SPECIFIED DURATIONS

BACKGROUND OF THE INVENTION

This invention relates to an editing device and, more particularly, to an editing device for sequentially editing desired discrete scenes (one-cuts).

In a conventional editing device, the user locates a desired scene or cut as he or she views a reproduced picture, and sets the start position and the end position of the cut for each cut by an extremely laborious operation.

Specifically, a video tape recorder with a built-in camera, referred to herein as a video camera, as a reproducing unit is connected to a video tape recorder, referred to herein as a VTR, as a recording unit, so that playback picture signals from the video camera are supplied to the VTR and to the monitor receiver.

Thus the user retrieves a desired cut to be edited, as he or she views the pictures displayed on the monitor receiver. The user then sets the start position (IN) and the end position (OUT) of the cut on the playback tape on the editing device, using, for example, a so-called time code or a tape counter.

The user then presses the edit button provided on the editing device. The editing device then causes the video camera to rewind the tape to IN and reproduce the playback tape, and subsequently cancels the temporary halt of recording, referred to herein as pause. As a result, recording of the desired cut is started.

When the recording up to "OUT" comes to a close, the editing device controls the pause of the video camera and the VTR. This sets the video camera and the VTR in a pause state to terminate the editing, that is, dubbing, of the desired cut.

When performing the editing of the next cut, it becomes necessary to press the playback button to re-start the playback of the video camera in order to effect the retrieval of the next desired cut by means of the setting of "IN" and "OUT".

Thus the conventional editing device suffers from the problem of a complicated operating procedure.

SUMMARY OF THE INVENTION

In view of the above-described status of the prior art, it is an object of the present invention to provide an editing device which is superior in operability and which enables the editing time to be reduced as compared to the conventional device.

According to the present invention, there is provided an editing device for controlling an editing operation comprising operating means for generating pre-set operating signals and command signal issuing means for detecting the operating signal and issuing a rewind playback command signal to a reproducing unit for effecting a rewind and playback operation for a pre-set time period. After the issuance of the rewind playback command signal, the command signal issuing means issues a pause canceling command signal to a recording unit which is in the recording pause state for canceling the recording pause state. The command signal issuing means also issues, after lapse of a pre-set time period from the issuance of the pause canceling command signal, a pause setting command signal to the recording unit for temporarily halting the recording by the recording unit.

In one aspect of the present invention, the pre-set time period may be set by time setting means, such as a rotary switch.

With the editing device of the present invention, the user operates operating means for issuing a rewind playback command signal to the reproducing unit for a pre-set time period, while issuing a pause canceling command signal to the recording unit. After lapse of a pre-set time period from the issuance of the pause canceling command signal, a pause setting command signal is issued to the recording unit for recording picture signals for the desired cut from the playback tape of the reproducing unit to the recording tape of the recording unit. The operation may be simplified significantly as compared with that achieved by the conventional device since if the user finds a desired scene for recording as he or she views the playback picture it is only necessary that she pushes the operating means, such as an edit button switch. Furthermore, there is no necessity of setting the recording start position (IN) or the recording end position (OUT) in distinction from the conventional device so that the editing time may be reduced significantly. In addition, the length of the cut may be set to a desired value by the recording time setting means.

DESCRIPTION OF THE PREFERRED EMBODIMENT

Figure 1:
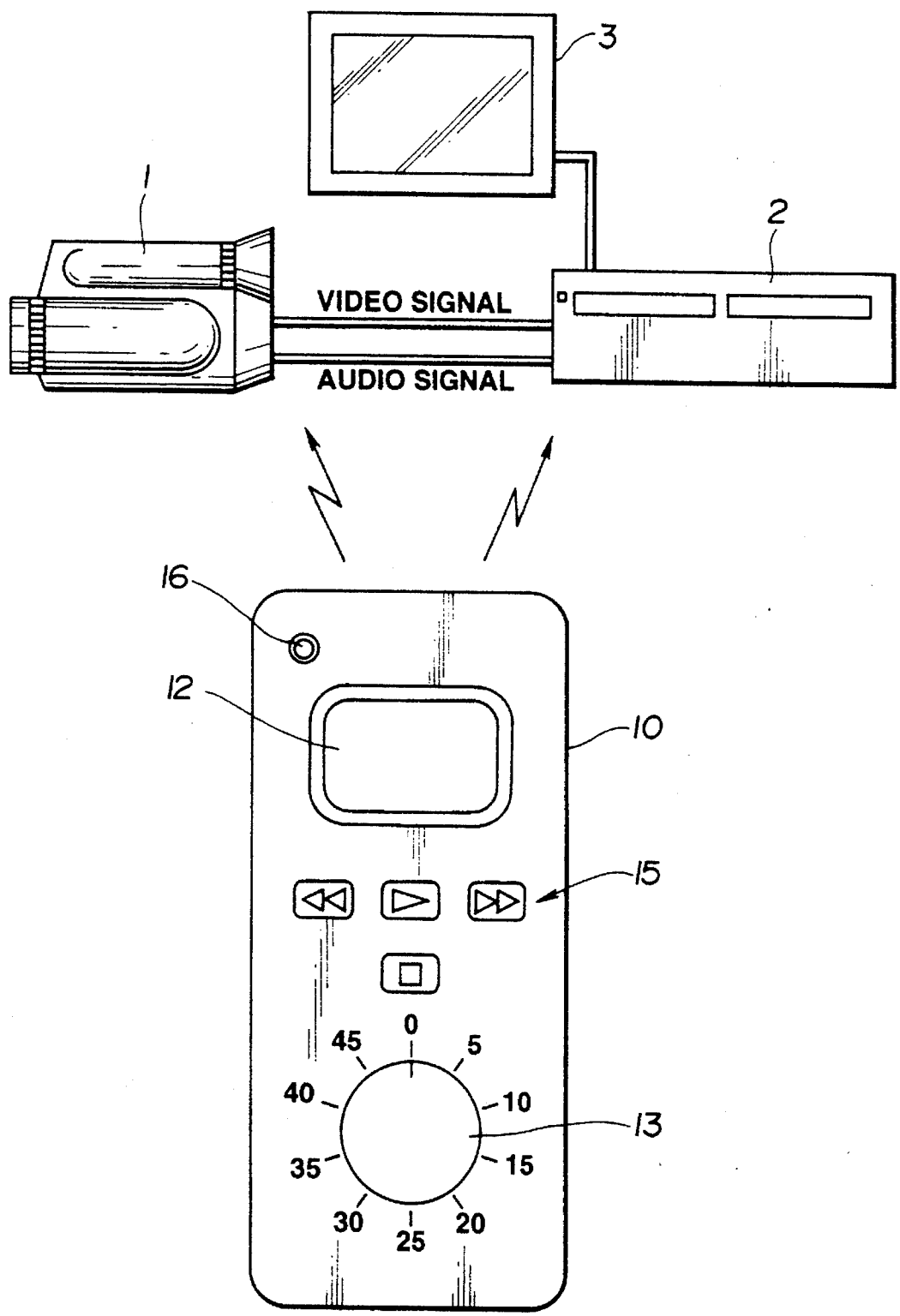
FIG. 1 is a block diagram showing an arrangement of an editing system employing an editing device according to the present invention.
Figure 2:
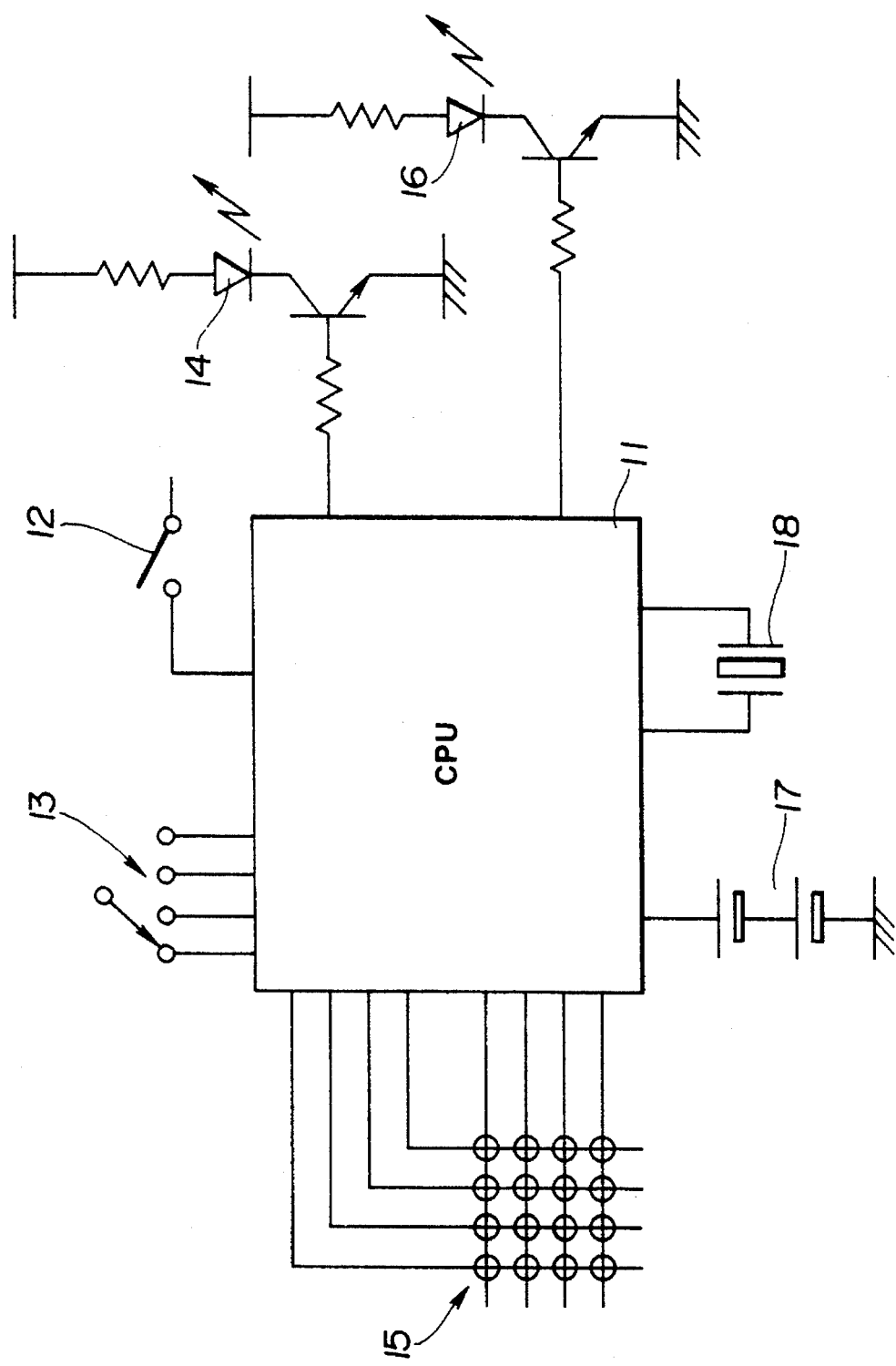
FIG. 2 is a block diagram showing a circuit arrangement for the editing device.

Referring to the drawings, an embodiment of the present invention will be explained in detail. FIGS. 1 and 2 illustrate the arrangement of the editing system employing the editing device according to the present invention and the circuitry of the editing device, respectively.

The editing system is first explained.

Referring to FIG. 1, the editing system is made up of a video tape recorder with a built-in camera 1, referred to hereinafter as a video camera, a video tape recorder, referred to as a VTR, as a picture recorder for recording playback picture signals from the video camera 1, a monitor receiver 3 for monitoring or viewing a picture reproduced by the video camera, and an editing device 10 for remote controlling the video camera 1 and the VTR 2.

When a desired scene or cut is presented as a playback picture displayed on the monitor receiver 3, the user viewing the displayed picture pushes an editing button switch 12 provided on an operating portion of the editing device 10. This causes various remote control command signals (remote control signals) to be sent from the editing device 10 to the video camera 1 and to the VTR 2, so that the cut is recorded by the VTR 2.

Specifically, the editing device 10 embodying the present invention includes, as shown in FIG. 2, a CPU 11, an editing button switch 12 for actuating the CPU 11, a rotary switch 13, an infrared light-emitting diode (infrared LED) 14, a key matrix switch 15, for remote controlling, for example, the video camera 1, a light emitting diode (LED) for display 16, a battery 17 for supplying the power to, above all, the CPU 11, and an oscillator 18 for generating clock signals. The CPU 11 issues a rewind playback command signal to the video camera 1 for a pre-set time period, and issues a pause canceling command signal to the VTR 2 for canceling a recording pause state. The CPU 11 also issues a pause setting command signal to the VTR 2 for temporarily halting the recording after lapse of a pre-set time period from the issuance of the pause canceling command signal. The rotary switch 13 sets the pre-set time period from the issuance of the pause release command signal supplied by CPU 11 until issuance of the pause setting command signal. The infrared LED 14 issues the command signals from the CPU 11 after conversion into, for example, infrared rays.

Figure 3:
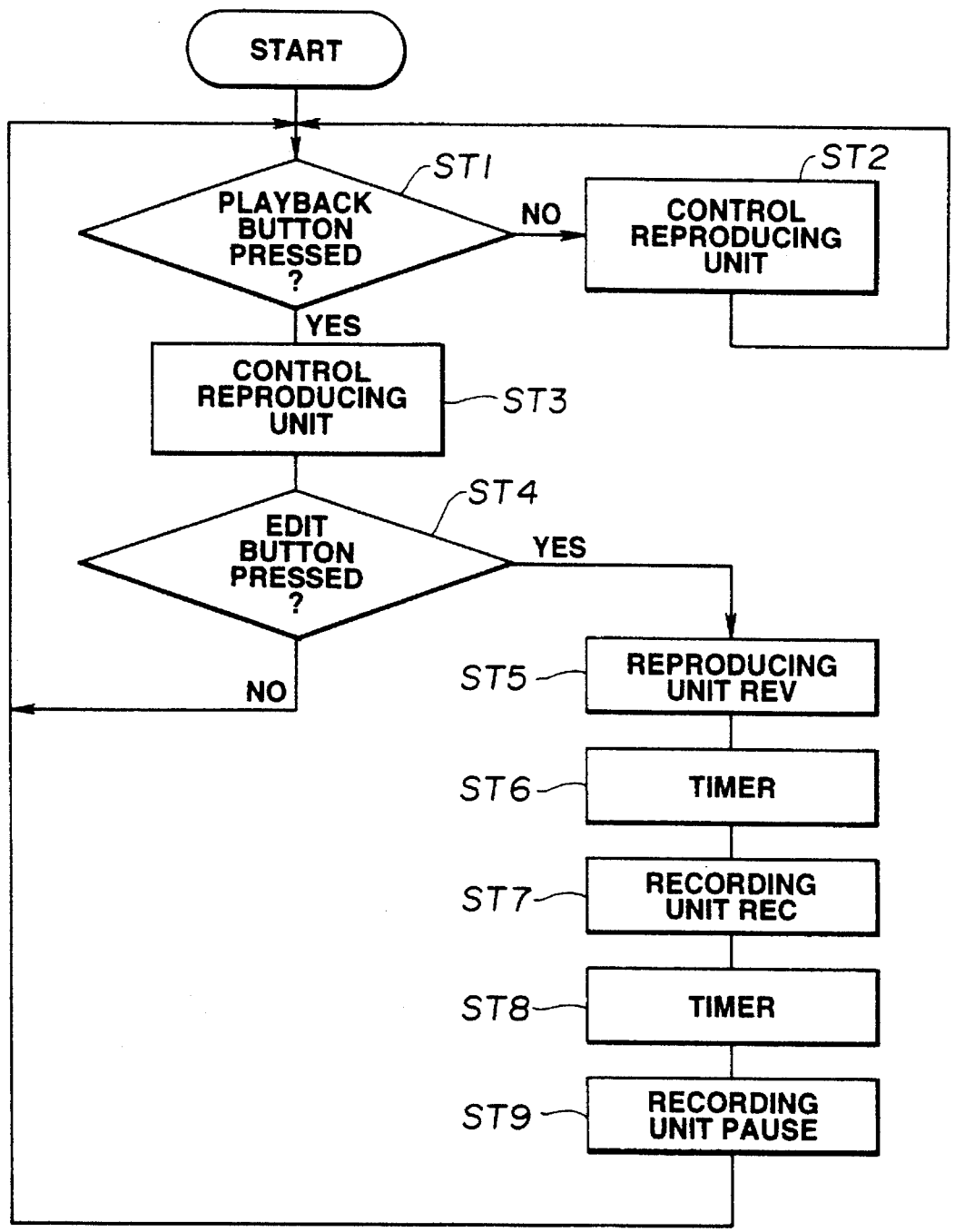
FIG. 3 is a flow chart for illustrating the operation of the editing device.

The CPU 11 is a so-called one-chip micro-computer provided with, for example, a read-only memory (ROM), a random-access memory (RAM) and an input/output interface (I/O), and is operated in accordance with a flow chart shown, for example, in FIG. 3.

Referring to the flow chart in FIG. 3, the CPU 11 decides, at a step ST1, whether the playback button for the video camera 1 of the key matrix switch 15 has been pressed. If the answer is NO, the CPU 11 proceeds to step ST2. If the answer is YES, the CPU 11 proceeds to a step ST3. At step ST3, the CPU 11 outputs a playback command signal for starting the playback to the video camera 1 in accordance with a format prescribed for the video camera. The CPU 11 then proceeds to a step ST4. The infrared LED 14 converts the playback command signal from the CPU 11 into infrared rays which are transmitted to the video camera 1. The video camera 1 accordingly starts the playback operation.

At the step ST2, the CPU 11 issues command signals, such as for stop, fast feed or the like, in association with the pressed button before reverting to the step ST1. As a result, the video camera 1 performs the stop, fast feed or the like operations.

At the step ST4, the user locates (retrieves) the desired cut, as he or she views the playback picture displayed on the monitor receiver 3, and presses the edit button switch 12. The CPU 11 detects a signal from the edit button switch 12 at this time and decides whether the user has pressed the edit button switch 12. If the answer is YES, the CPU 11 proceeds to a step ST5. If the answer is NO, the CPU 11 reverts to the step ST1. The technique of initially setting the video camera 1 to the playback state is not limited to the technique at the steps ST1 and ST3. Thus, for example, the playback state may also be set by directly acting on the video camera 1. That is, the key matrix switch 15 need not necessarily be provided on the editing device 10. In such case, the operations of the steps ST1, ST2 and ST3 may be eliminated and the CPU 11 repeats the step ST4 until the edit button switch 12 is pressed.

Figure 4:
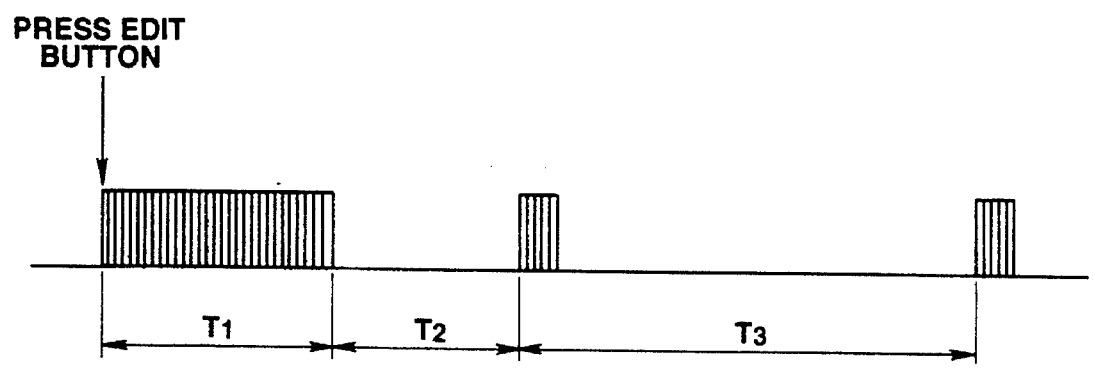
FIG. 4 is a timing chart for command signals output from the editing device.

At the step ST5, the CPU 11 issues the rewind playback command signal (REV signal) for a pre-set time interval, for example, for a time interval $T_1$, such as 2 to 3 seconds, from the pressing of the edit button switch 12, as shown in FIG. 4, before proceeding to a step ST6. As a result, the video camera performs rewind playback operations for 2 to 3 seconds.

At the step ST6, the CPU 11 measures the time interval which elapses since the REV signal on the video camera 1 ends until the playback time is stabilized using a timer before proceeding to a step ST7. Specifically, the CPU 11 measures the time interval $T_2$ by counting clock signals, as shown in FIG. 4.

At the step ST7, the CPU 11 issues to a VTR 2 a pause canceling command signal that cancels the temporary recording stop (recording pause), as shown in FIG. 4, in accordance with the format as prescribed for the VTR, before proceeding to a step ST8. As a result, the VTR 2 starts its recording operation.

At the step ST8, the CPU 11 measures the pre-set time period as set by the user with the rotary switch 13, that is, the recording time period $T_3$, using a timer, as shown in FIG. 4, before proceeding to a step ST9. The time period that can be set by the rotary switch 13 is based on, for example, 5 seconds as a unit, and is up to 45 seconds.

At the step ST9, the CPU 11 issues a recording pause setting signal to the VTR 2 for temporarily halting the recording before reverting to the step ST1.

In this manner, the video signal from a start position 21a of a desired cut up to an end position 21b on a playback tape 21 loaded on the video camera 1 is recorded, that is, dubbed, on a recording tape 22 loaded in the VTR 2. The recording start position 22a may be approximately one second ahead of the start position 21a of the desired cut, as shown, for example, in FIG. 5. During the recording of the desired cut, the LED 16 provided on the operating part may be lighted from the issuance of the pause canceling command signal until issuance of the pause setting command signal in order to apprise the user of the fact that the recording is proceeding.

Figure 5:
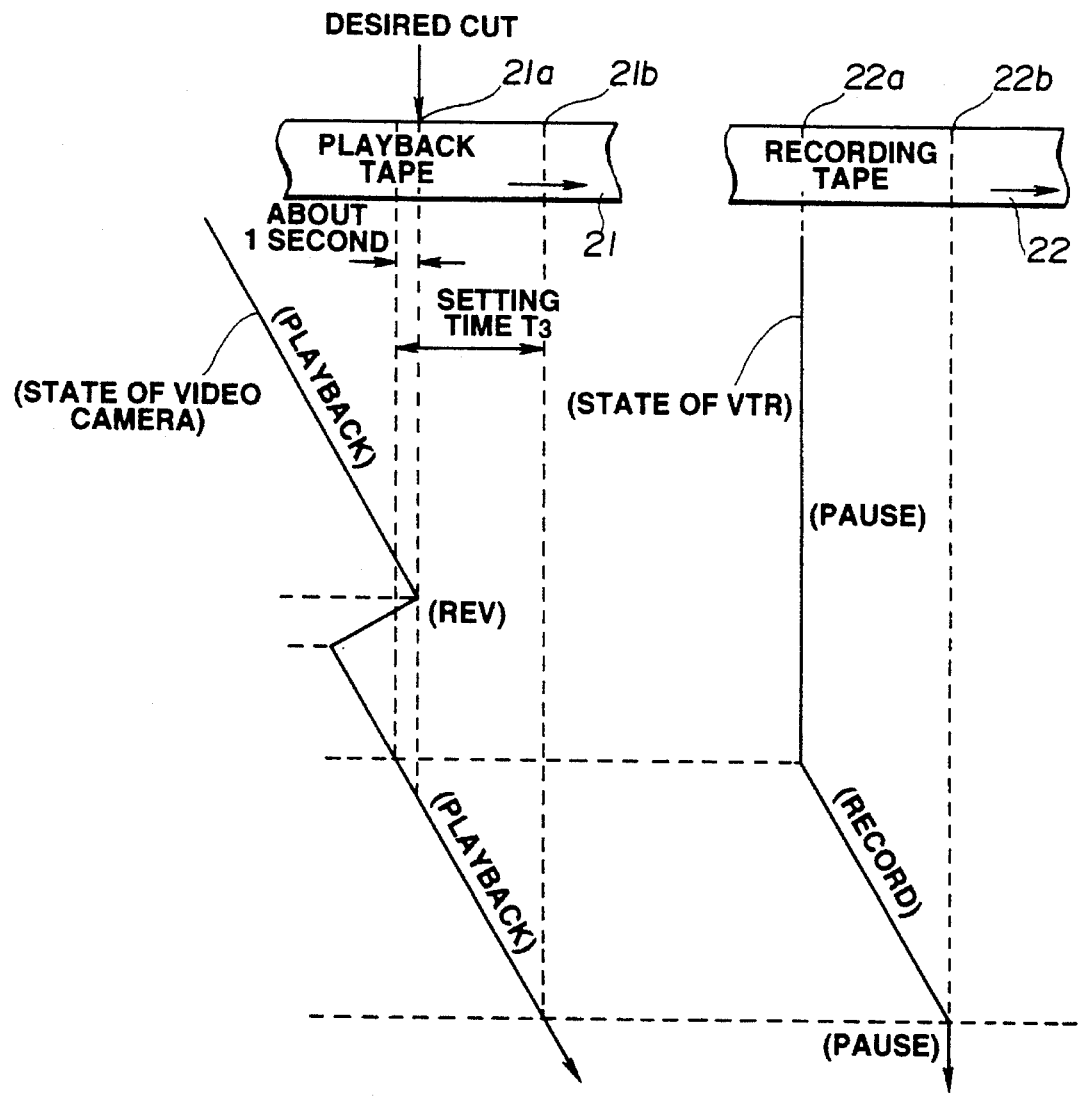
FIG. 5 is a timing chart showing in tapes loaded the video camera and the VTR making up the editing system, along with the operating state of the video camera and the VTR.

When the recording comes to an end, the video camera 1 continues in the playback state, while the VTR 2 is in the recording pause state, as indicated in FIG. 5, such that the user is able to retrieve the desired one cut and press again the edit button switch 12 as he or she continues to view; the playback picture. Thus the operation may be simplified significantly as compared with that of the conventional device. There is also no necessity of setting the recording start position (IN) or the recording end position (OUT) as required with the conventional device, so that the editing time may be reduced significantly. In addition, the length of the one cut may be set by the rotary switch 13 to, for example, 5 seconds, to facilitate viewing of the cut.

Furthermore, the editing device 10 is simpler in circuit construction, as shown in FIG. 2, while being small-sized, lightweight, and lower in cost than the conventional device. In addition, the device consumes less power and may be operated by a battery.

What is claimed is:

1. An editing device for controlling an editing operation of an editing system having a reproducing unit and a recording unit, comprising:

operating means actuated by a user, for generating pre-set operating signals including an edit operating signal in response to the actuation of said operating means by the user; and command signal issuing means for detecting said edit operating signal, said command signal issuing means having means for issuing a rewind playback command signal to said reproducing unit after detection of said edit operating signal by said command signal issuing means, and thereby effecting a rewind operation of said reproducing unit for a first pre-set time interval followed by playback operation of said reproducing unit, means for issuing a pause cancelling command signal to said recording unit in a recording pause state after detection of said edit operating signal by said command signal issuing means, and thereby effecting cancellation of the recording pause of said recording unit, and means for issuing a pause setting command signal to said recording unit a second pre-set time interval after issuance of said pause cancelling command signal in response to said detected edit operating signal, and thereby temporarily halting the recording operation of said recording unit.

2. The editing device as claimed in claim 1, further comprising time setting means for setting said second pre-set time interval.

3. The editing device as claimed in claim 1, wherein said command signal issuing means issues said pause cancelling command signal after the rewind operation of said reproducing unit and before restarting the playback operation of said reproducing unit, playback commencing with signals being reproduced at the time of the actuation of said operating means.

4. The editing device as claimed in claim 1, further comprising:

converting means for converting said rewind playback signal, said pause cancelling command signal and said pause setting command signal into infrared rays.

5. The editing device as claimed in claim 1, further comprising display means for making a pre-set display indicating the recording operation of said recording unit during a time period between the issuance of said pause cancelling command signal and the issuance of said pause setting command signal.

6. The editing device as claimed in claim 1, further comprising:

second operating means actuated by the user, for generating a playback operating signal in response to the actuation of said second operating means by the user; and second command signal issuing means for detecting said playback operating signal, and thereafter issuing a playback command signal to said reproducing unit to effect a playback operation of said reproducing unit.

* * * * *